(12) United States Patent
Walton et al.

(10) Patent No.: US 9,534,626 B2
(45) Date of Patent: Jan. 3, 2017

(54) ENVIRONMENTAL PROTECTION FOR LOWERABLE POLE

(71) Applicant: Swivelpole Patent Pty Ltd, Mandurah, Western Austrailia (AU)

(72) Inventors: Michael Walton, Houston, TX (US); Andrew J. Grant, Houston, TX (US)

(73) Assignee: SWIVELPOLE PATENT PTY LTD, Mandurah, Western (AU)

( * ) Notice: Subject to any disclaimer, the term of this patent is extended or adjusted under 35 U.S.C. 154(b) by 0 days.

(21) Appl. No.: 14/443,091

(22) PCT Filed: Jun. 6, 2014

(86) PCT No.: PCT/AU2014/000590
§ 371 (c)(1),
(2) Date: May 15, 2015

(87) PCT Pub. No.: WO2014/194367
PCT Pub. Date: Dec. 11, 2014

(65) Prior Publication Data
US 2015/0275961 A1   Oct. 1, 2015

Related U.S. Application Data

(63) Continuation-in-part of application No. 13/913,175, filed on Jun. 7, 2013, now abandoned.

(51) Int. Cl.
*F16C 5/00* (2006.01)
*E04H 12/18* (2006.01)
(Continued)

(52) U.S. Cl.
CPC .............. *F16C 5/00* (2013.01); *E04H 12/187* (2013.01); *F21V 21/36* (2013.01); *F21V 21/10* (2013.01); *Y10T 403/16* (2015.01)

(58) Field of Classification Search
CPC .......... F21V 21/10; F21V 21/26; F21V 21/28; F21V 21/30; F21V 21/36; F16L 2/028; F16L 2/032; F16L 27/0841; F16L 27/0849; H02G 3/06; E04H 12/18; E04H 12/187
See application file for complete search history.

(56) References Cited

U.S. PATENT DOCUMENTS

| | | | |
|---|---|---|---|
| 442,809 A | 12/1890 | Hunter | 285/181 |
| 783,987 A | 2/1905 | Walsh | 285/184 |

(Continued)

FOREIGN PATENT DOCUMENTS

| | | |
|---|---|---|
| CA | 2163491 | 3/1997 |
| DE | 2918532 | 11/1980 |

(Continued)

OTHER PUBLICATIONS

International Search Report (ISR) issued in connection with corresponding International Patent Application No. PCT/AU2014/000590, dated Sep. 5, 2014.
(Continued)

*Primary Examiner* — Daniel Wiley
(74) *Attorney, Agent, or Firm* — Kusner & Jaffe

(57) ABSTRACT

An environmentally robust joint for use in a lowering pole assembly comprising a lower pole section and an upper pole section. The joint includes a lower adaptor comprising a lower pivot member defining a first central wiring passage and an upper adaptor comprising an upper pivot member defining a second central wiring passage communicating with the first central wiring passage. The upper pivot member is rotationally coupled to the lower pivot member, and sharing a common axis of rotation. At least one of the lower adaptor and the upper adaptor comprises a pole adaptor mounted at an operative angle to the axis of rotation. The pole adaptor includes an open end for receiving an end of a (Continued)

pole section, and an internal wiring tube communicating with the first central wiring passage and the second central wiring passage.

11 Claims, 15 Drawing Sheets

(51) Int. Cl.
*F21V 21/36* (2006.01)
*F21V 21/10* (2006.01)

(56) References Cited

U.S. PATENT DOCUMENTS

| | | | | |
|---|---|---|---|---|
| 852,157 | A | 4/1907 | Behan | 303/86 |
| 960,899 | A | 6/1910 | Guyer | 285/181 |
| 1,020,839 | A | 3/1912 | Niesen | 285/184 |
| 1,233,170 | A | 7/1917 | Berry | 285/90 |
| 1,526,336 | A | 2/1925 | Hart | 285/31 |
| 1,601,014 | A | 9/1926 | Wismer | 362/386 |
| 1,605,507 | A | 11/1926 | Burke | 285/98 |
| 1,822,260 | A | 9/1931 | Adams | 285/181 |
| 1,880,098 | A | 9/1932 | Mair | 285/184 |
| 2,212,747 | A | 8/1940 | O'Leary | 285/87 |
| 2,250,448 | A | 9/1941 | Edwards | 403/337 |
| 2,342,120 | A | 2/1944 | Cartwright | 239/125 |
| 2,447,947 | A | 8/1948 | Larson | 285/181 |
| 2,448,494 | A | 8/1948 | Moser | 248/123.11 |
| 2,458,967 | A | 1/1949 | Wiedenhoeft | 248/283.1 |
| 2,479,580 | A | 8/1949 | Marce | 285/331 |
| 2,577,811 | A | 12/1951 | Rutledge | 403/102 |
| 2,632,660 | A | 3/1953 | Krauthamer | 403/53 |
| 2,694,585 | A | 11/1954 | Fiori | 403/120 |
| 2,729,473 | A | 1/1956 | Warshawsky | 285/153.1 |
| 2,910,309 | A | 10/1959 | Snyder et al. | 285/41 |
| 2,910,310 | A | 10/1959 | Mulac | 285/91 |
| 2,951,716 | A | 9/1960 | Myers | 285/273 |
| 2,990,204 | A | 6/1961 | Golden | 248/291.1 |
| 3,342,511 | A * | 9/1967 | Galloway | F16B 7/00 |
| | | | | 285/149.1 |
| 3,355,847 | A | 12/1967 | Pratt | 52/116 |
| 3,366,788 | A * | 1/1968 | Lantery | F21V 21/28 |
| | | | | 174/86 |
| 3,737,179 | A | 6/1973 | White | 285/96 |
| 3,778,610 | A | 12/1973 | Wolf | 362/418 |
| 4,008,910 | A | 2/1977 | Roche | 285/153.1 |
| 4,020,606 | A | 5/1977 | Pratt | 52/116 |
| 4,090,210 | A | 5/1978 | Wehling | 362/419 |
| 4,592,177 | A | 6/1986 | Pratt | 52/116 |
| 4,991,622 | A | 2/1991 | Brewer et al. | 137/512 |
| 5,016,154 | A * | 5/1991 | Leeyeh | F21S 6/007 |
| | | | | 362/414 |
| 5,275,444 | A | 1/1994 | Wythoff | 285/90 |
| 5,333,436 | A | 8/1994 | Noble | 52/849 |
| 5,398,978 | A | 3/1995 | Gagnon | 285/363 |
| 5,624,198 | A | 4/1997 | Fuchs | 403/76 |
| 5,687,537 | A | 11/1997 | Noble | 52/849 |
| 5,772,172 | A | 6/1998 | Sampedro | 248/415 |
| 5,794,387 | A | 8/1998 | Crookham | 52/122.1 |
| 5,813,706 | A | 9/1998 | Travis | 285/363 |
| 6,045,239 | A | 4/2000 | Waldmann | 362/287 |
| 6,050,614 | A | 4/2000 | Kirkpatrick | 285/368 |
| 6,070,996 | A | 6/2000 | McCollum | 362/431 |
| 6,902,200 | B1 * | 6/2005 | Beadle | F16C 11/04 |
| | | | | 285/185 |
| 6,957,832 | B1 | 10/2005 | Pannekoek | 285/184 |
| 7,690,822 | B2 | 4/2010 | Kauffman | 362/418 |
| 7,699,355 | B2 | 4/2010 | Vitel et al. | 185/184 |
| 8,262,265 | B2 * | 9/2012 | Hsieh | F21S 6/002 |
| | | | | 362/153 |
| 8,814,221 | B2 | 8/2014 | Grant | 285/184 |
| 2006/0050519 | A1 * | 3/2006 | Lin | F21S 6/003 |
| | | | | 362/413 |
| 2014/0261837 | A1 | 9/2014 | van der Meijden et al. | 138/109 |
| 2014/0265308 | A1 | 9/2014 | Reilly et al. | 285/153.1 |
| 2014/0360754 | A1 | 12/2014 | Walton et al. | 174/86 |

FOREIGN PATENT DOCUMENTS

| | | |
|---|---|---|
| DE | 4210625 | 10/1993 |
| DE | 10152129 | 4/2003 |
| FR | 2217625 | 9/1974 |
| GB | 410600 | 5/1934 |

OTHER PUBLICATIONS

Patent Examination Report No. 1 issued in connection with corresponding Australian Patent Application No. 2014277622, dated Feb. 23, 2015.

\* cited by examiner

ENVIRONMENTAL PROTECTION FOR LOWERABLE POLE

RELATED APPLICATIONS

This application is a U.S. National Stage Application of International Application No. PCT/AU14/00590, filed Jun. 6, 2014, which claims the benefit of U.S. application Ser. No. 13/913,175, filed Jun. 7, 2013.

FIELD OF THE INVENTION

The present invention relates to poles, such as light poles, which are lowerable. Although the invention has been developed in connection with light poles including a swivelling joint, it is considered applicable to other lowering poles including hinged poles and telescoping poles.

BACKGROUND TO THE INVENTION

Due to the perils of ladder use in industrial settings and the general inconvenience of maintenance of pole-mounted items, industrial poles (e.g., lighting poles) have been developed that have upper and lower pole sections arranged to be connected by a joint, such as a swivelling or pivot joint, a hinged joint, or a telescoping joint. The principle is that these joints permit a user to lower the remote (e.g., top) end of the pole using the joint. For example, moving the top end to a level closer to the pole base may facilitate changing light bulbs or performing other maintenance.

In the case of a swivelling or pivot joint, the upper pole section is attached to the joint such that upper pole section rotates about an axis of rotation relative to the bottom end of the upper pole section. The axis of rotation is not parallel with the longitudinal axis of the pole. Instead, the swivelling or pivot joint is mounted with the axis of rotation at an acute angle to both the upper and lower sections. In this way the nominal top end of the upper pole section travels downward in an arc corresponding to the rotational motion of the swivelling or pivot joint. The system including the joint and the coupled upper and lower sections of the pole may be called a pivoting pole assembly, swivelling pole assembly, etc.

In the case of a hinged joint, the upper pole section is arranged relative to the lower pole section such that it can rotate about an axis perpendicular to the longitudinal axis of the pole.

In the case of a telescoping joint, the upper pole section is arranged to be moveable in an axial direction relative to the lower pole section, with one of the upper and lower pole sections having a smaller diameter than the other.

Some known systems also have a passage interior to the pole extending from the base end, through the joint, to the remote end, and wiring (wires, cables, etc.) running through the passage to the mounted item to provide power, communications, and so on. This wiring can be subject to damage due to environmental conditions, particularly where the joint permits ingress of water.

The present invention seeks to provide a means of protecting internal wiring within a lowerable pole.

SUMMARY OF THE INVENTION

According to one aspect of the present invention there is provided a joint for use in a lowering pole assembly, the lowering pole assembly including a lower pole section and an upper pole section, the upper pole section being moveable relative to the lower pole section, the joint including a lower portion defining a first central wiring passage which is fixed relative to the lower pole section; and an upper portion defining a second central wiring passage which is fixed relative to the upper pole section, the second central wiring passage communicating with the first central wiring passage; the joint including an internal wiring tube communicating with the first central wiring passage and the second central wiring passage.

The lowering pole assembly may include wiring or cabling operatively coupled with a mounted item. The item could be, for example, a light fixture, remote camera, loudspeaker, or any other item.

The upper pole section may be receivable inside a receiving sleeve. The receiving sleeve may form part of the lower pole section, or may be connected to the upper portion of the joint. The internal wiring tube may be configured to overlap the end of the upper pole section, forming a fluid flow barrier between the receiving sleeve and the upper pole section. The internal wiring tube may include a first end that protrudes from an open end of the receiving sleeve along the longitudinal axis.

In the case of a telescoping joint, the internal wiring tube may be arranged such that its uppermost end is above the uppermost end of the lower pole section and its lowermost end is below the lowermost end of the upper pole section.

In the case of a swivelling joint, the axis of rotation may intersect the first wiring passage and the second wiring passage. The axis of rotation may be coaxial with the first wiring passage and the second wiring passage. At least one of the lower joint portion and the upper joint portion may include a junction box module. The lower joint portion and the upper joint portion may each include a pole adaptor mounted at an operative angle to the axis of rotation. Each pole adaptor may be substantially cylindrical and the longitudinal axis of the cylindrical pole adaptor of the lower joint portion and the longitudinal axis of the cylindrical pole adaptor of the upper joint portion may be coaxial or offset.

A swivelling joint may include an upper pivot member and a lower pivot member, along with an annular locking mechanism configured to selectably hold the upper pivot member immobile with respect to the lower pivot member. The annular locking mechanism may include one or more arcuate channels formed on at least one of the lower pivot member and the upper pivot member, the channels radially offset from the axis of rotation; and at least one guide member corresponding to each arcuate channel disposed on the other of the lower pivot member and the upper pivot member. The one or more arcuate channels and the at least one corresponding guide member may rotate with respect to one another such that the at least one guide member tracks along one of the one or more arcuate channels, and a range of relative rotation of the upper pivot member with respect to the lower pivot member is defined by the length of the channels. One or more of the at least one guide member may include an elongate member engaged with the other of the lower pivot member and the upper pivot member. One or more of the at least one guide member may include an elongate member engaged with the other of the lower pivot member and the upper pivot member. One or more of the at least one guide member may include at least one of: i) a threaded bolt; ii) a pin; iii) a dowel; iv) a rod; and v) a protrusion. The upper pivot member and the lower pivot member may include interlocking flange plates.

BRIEF DESCRIPTION OF THE DRAWINGS

It will be convenient to further describe the invention with reference to preferred embodiments of the present invention.

Other embodiments are possible, and consequently the particularity of the following discussion is not to be understood as superseding the generality of the preceding description of the invention. In the drawings.

DETAILED DESCRIPTION OF PREFERRED EMBODIMENTS

Figures 1A, 1B:
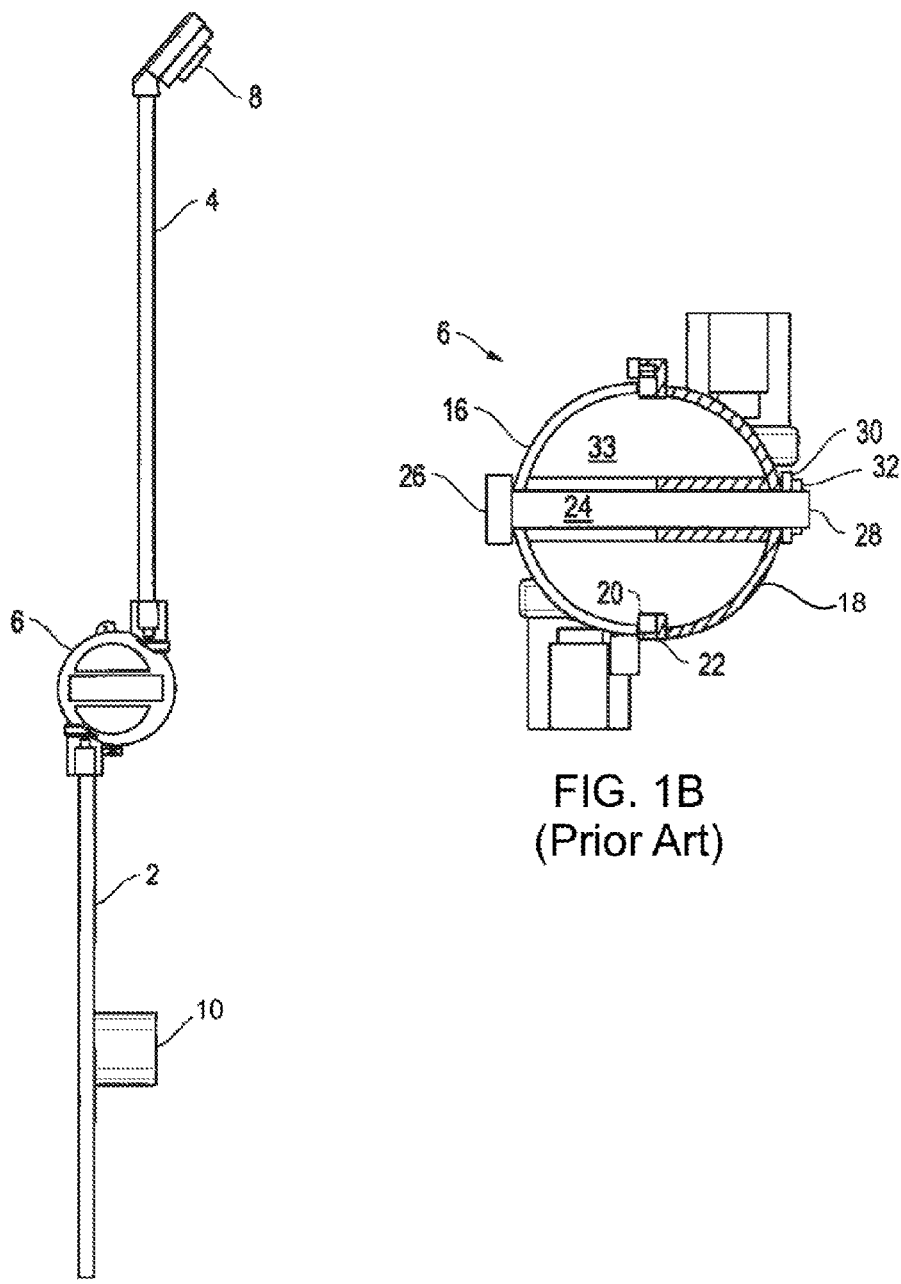
FIGS. 1A and 1B (Prior Art) illustrate perspective views of a particular prior art rotational pole and pivot joint.

Lowering pole assemblies are known in the art. FIGS. 1A and 1B illustrate perspective views of a particular prior art rotational pole and pivot joint, respectively. Referring to FIG. 1A, the prior art rotational pole includes a lower conduit 2, an upper conduit 4, a pivot joint 6, a light fixture 8, and a junction box 10. The pole may be mounted to a rail or attached to a base (not shown). Electrical wiring (not shown) runs within conduits 2, 4 from the base end of the pole 12 through pivot joint 6 to the remote end 14 and is connected to light fixture 8. Upper conduit 4 may be pivoted down for maintenance.

Referring to FIG. 1B, the prior art pivot joint 6 includes a fixed cup 16 and a rotating cup 18. Together, the fixed cup 16 and the rotating cup 18 define a substantially spherical wiring chamber. The circular edges of the cups end in flanges 20, 22 which meet in sliding rotational contact defining a swivel plane. The flanges 20, 22 may include a lip so that one cup is partially nested in the other. The cups 16, 18 are held together by a central locking bolt 24, which passes approximately through the diameter of the spherical wiring chamber 33 formed by the cups. The bolt 24 includes a head 26 retained in a recess of the lower cup 16 and a threaded end 28 (opposite the head) protruding through the upper cup 18, and held in place by a washer 30 and a nut 32 providing a compressive force against the outside of upper cup 18. Pivot joint 6 may also include a rubber stop block, mechanical stops and/or an indexing pin (not shown). Stop block and the mechanical stop can be radially spaced ninety degrees (90°), one hundred eighty degrees (180°), or any other desired angle, with respect to each other. Moreover, removable stops can be provided to lock the lower and upper cups 14, 16 in a vertical orientation. When the removable stops are removed, as the upper cup is rotated about the locking bolt with respect to the lower cup, the stop block makes contact with the mechanical stop at the desired angle and will prevent further rotation. An indexing pin can be inserted through aligned holes formed in the lower and upper cup flanges to temporarily lock the cups with respect to each other.

One embodiment of the present invention is as an environmentally robust pivot joint adaptor. The pivot joint adaptor allows for connection of a lower pole section and an upper pole section to form a pivot joint assembly. The pivot joint adaptors of the present disclosure are advantageous over the prior art in ways that will become apparent from more particular descriptions to follow of embodiments of this form of the invention.

Example embodiments were chosen and described in order to best explain the principles of the invention and their practical application, and to enable others of ordinary skill in the art to understand the invention for various embodiments with various modifications as are suited to the particular use contemplated. Those skilled in the art will understand, however, that the invention may be embodied as many other devices, systems, and methods. For example, various aspects of the methods and devices may be combined in various ways or with various products, including existing products. Many modifications and variations will be apparent to those of ordinary skill in the art. The scope of the invention is not intended to be limited by the details of example embodiments described herein. The scope of the invention should be determined through study of the appended claims.

Specific design details have been provided for illustration, but should not be considered limiting. Readers of skill in the art will recognize that many variations of lowering joints and lowering pole assemblies may be implemented consistent with the scope of the invention as described by the appended claims.

FIGS. 2A-2H illustrate pivot joint adaptors 200 in accordance with embodiments of the present disclosure. Pivot joint adaptor 200 (also called a conversion pivot joint) may be used to assemble a wired pivoting pole assembly, without the use of welding equipment or heavy tools, by coupling a lower pole section 250 and an upper pole section 251 while enabling selectable rotation. Pivot joint adaptor 200 may also facilitate replacement of a previous pole installation.

Pivot joint adaptor 200 is environmentally robust in that it includes features that, upon completion of assembly, protect the wiring residing interior to the assembly. Pivot joint adaptor 200 includes a lower adaptor 212 terminating in a lower pivot member 222 defining a first central wiring passage 232. Pivot joint adaptor 200 also includes an upper adaptor 210 including an upper pivot member 220 defining a second central wiring passage 230 communicating with the first central wiring passage 232. Upper pivot member 220 and lower pivot member 222 are cooperatively coupled to share a common axis of rotation 240 and allow relative rotation about the common axis of rotation 240, thus forming pivot joint 202 which pivotally connects upper adaptor 210 and lower adaptor 212. The axis of rotation 240 may intersect the first central wiring passage 232 and the second central wiring passage 230. Pivot joint components are discussed in greater detail below with reference to FIGS. 3A-3E. At least one of the lower adaptor 212 and the upper adaptor 210 (and possibly both) includes a pole adaptor 214 mounted at an angle θ to the axis of rotation 240. Pole adaptor 214 is oriented such that the lower pole section and the upper pole assembly are vertically oriented. Other implementations may be configured so that one or both of upper and lower pole sections are not perfectly vertically oriented (i.e., aligned at an angle other than 90 degrees from horizontal). The pole adaptor 214 includes a mating surface 216 and an internal wiring tube 218. The mating surface 216 includes an open end for receiving an end of a pole section. The internal wiring tube 218 is communicating with the first central wiring passage 232 and the second central wiring passage 230. Some adaptors 210, 212 may include mating surfaces adapted for connection with several object types or sizes, such as, for example, poles of various shapes and diameters. The mating surface may be implemented as cylindrical or square tubular members made from aluminium, stainless steel, galvanized steel, or other durable material. The mating surface 216 includes at least one fastener 209, such as, for example, bolts or latches. The mating surface 216 may be configured to slide an exterior surface of a corresponding pole section along the interior mating surface 216, although in other embodiments, the pole section may fit loosely in the annulus.

Figure 2A:
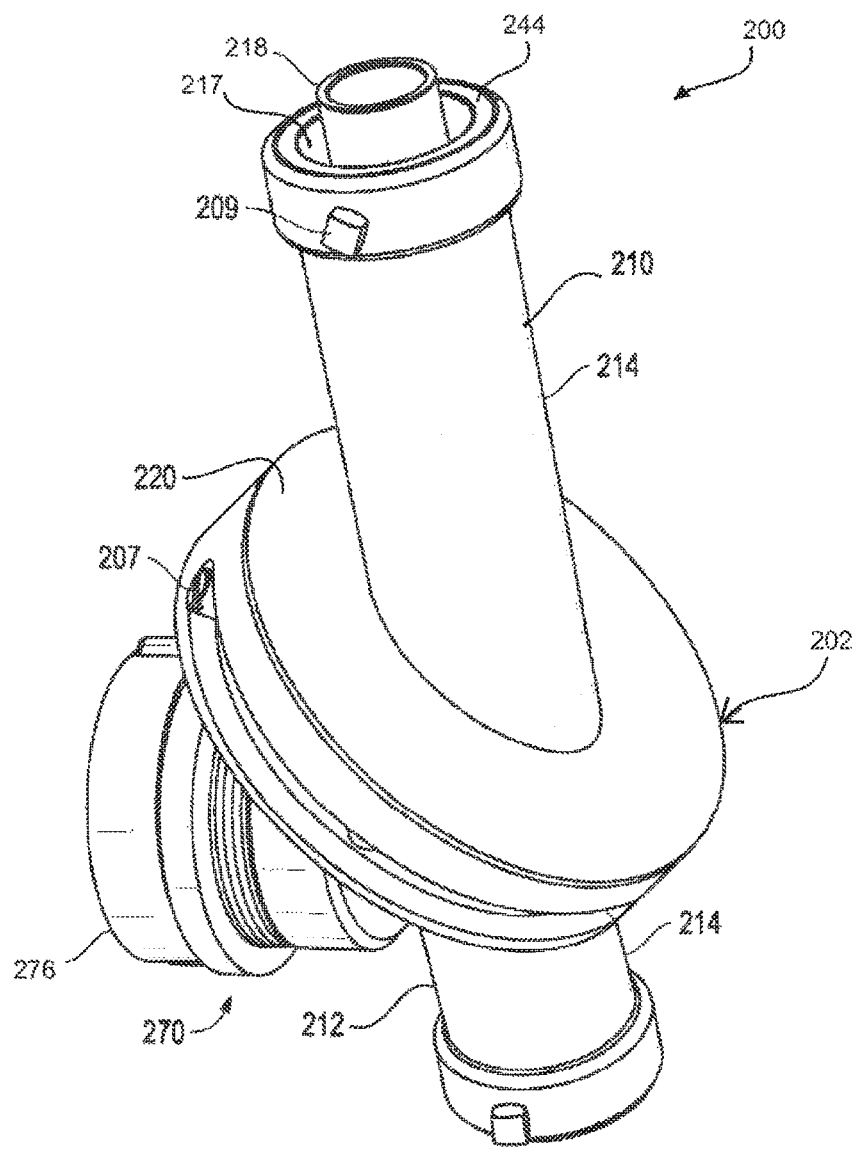
FIGS. 2A-2I illustrate pivot joint adaptors in accordance with embodiments of the present disclosure.
Figure 2B:
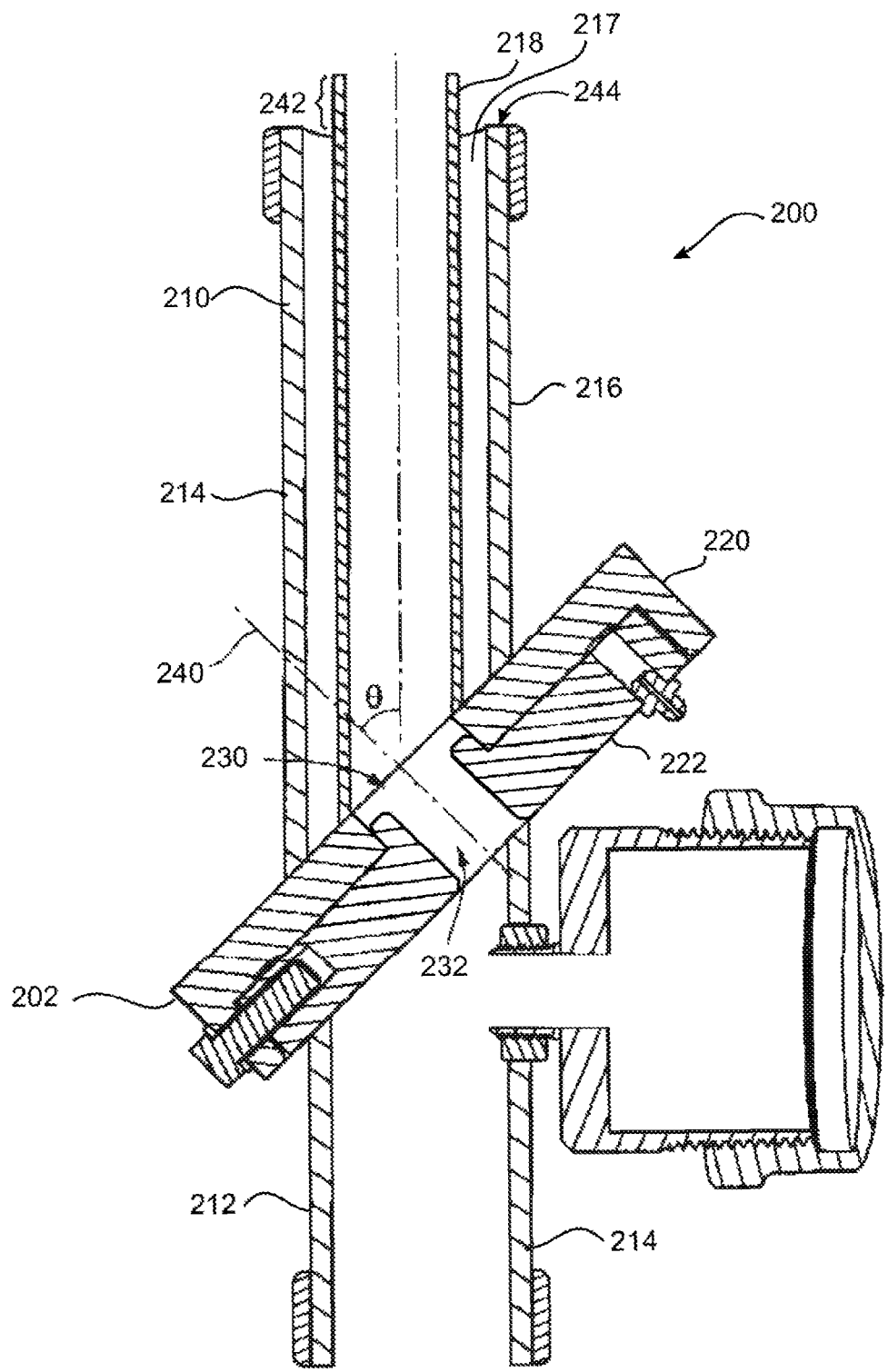
Figure 2C:
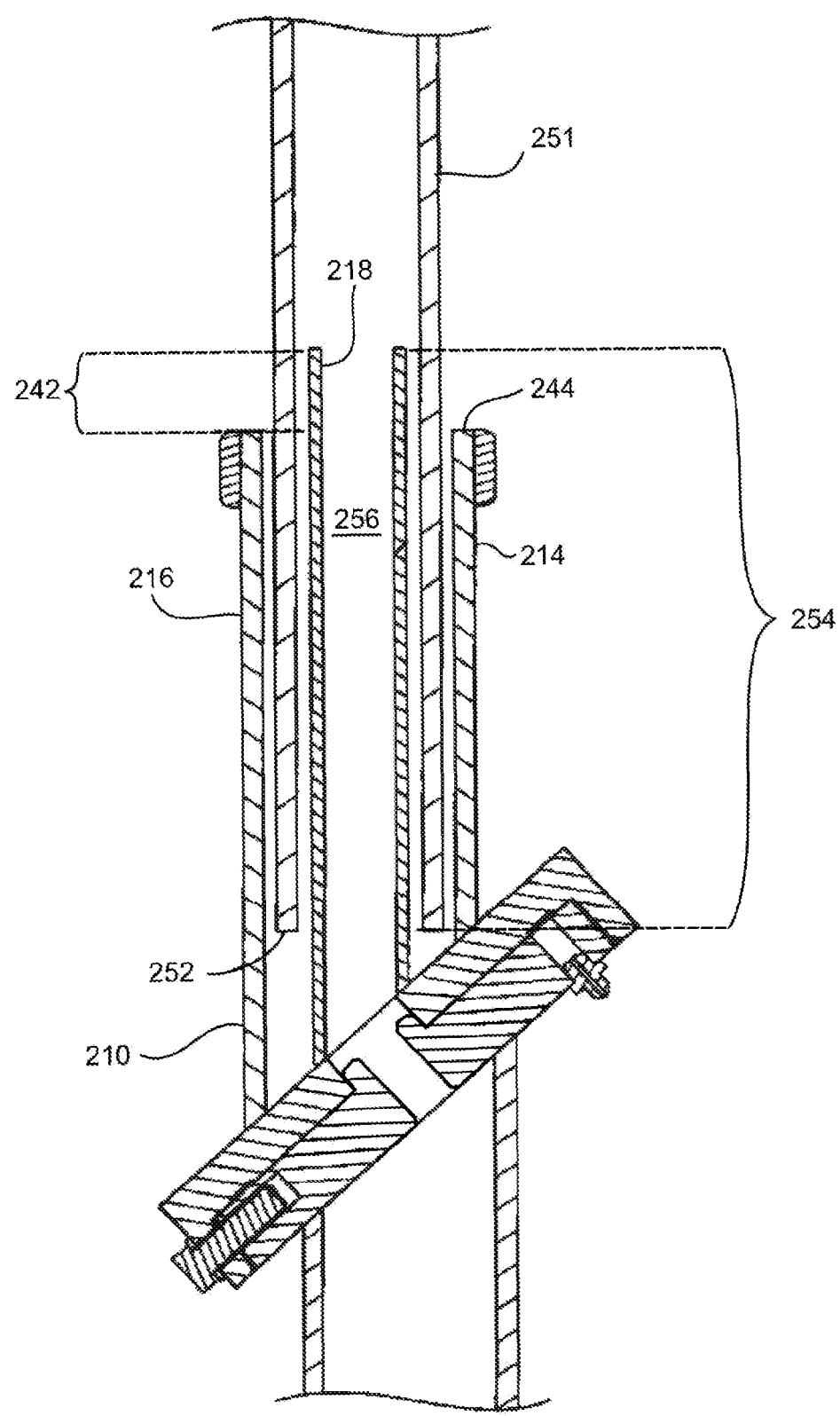
Figure 2D:
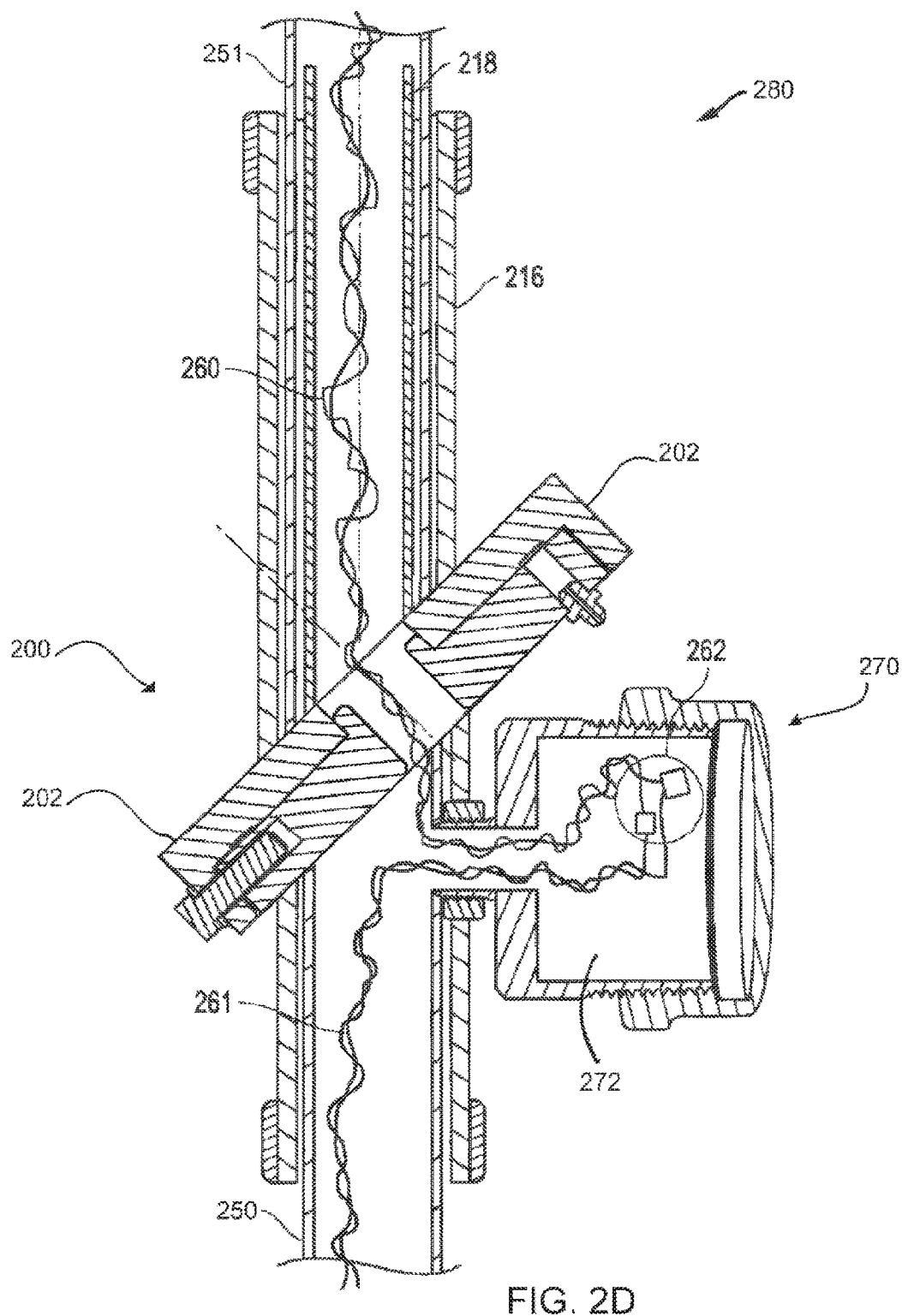
Figure 2E:
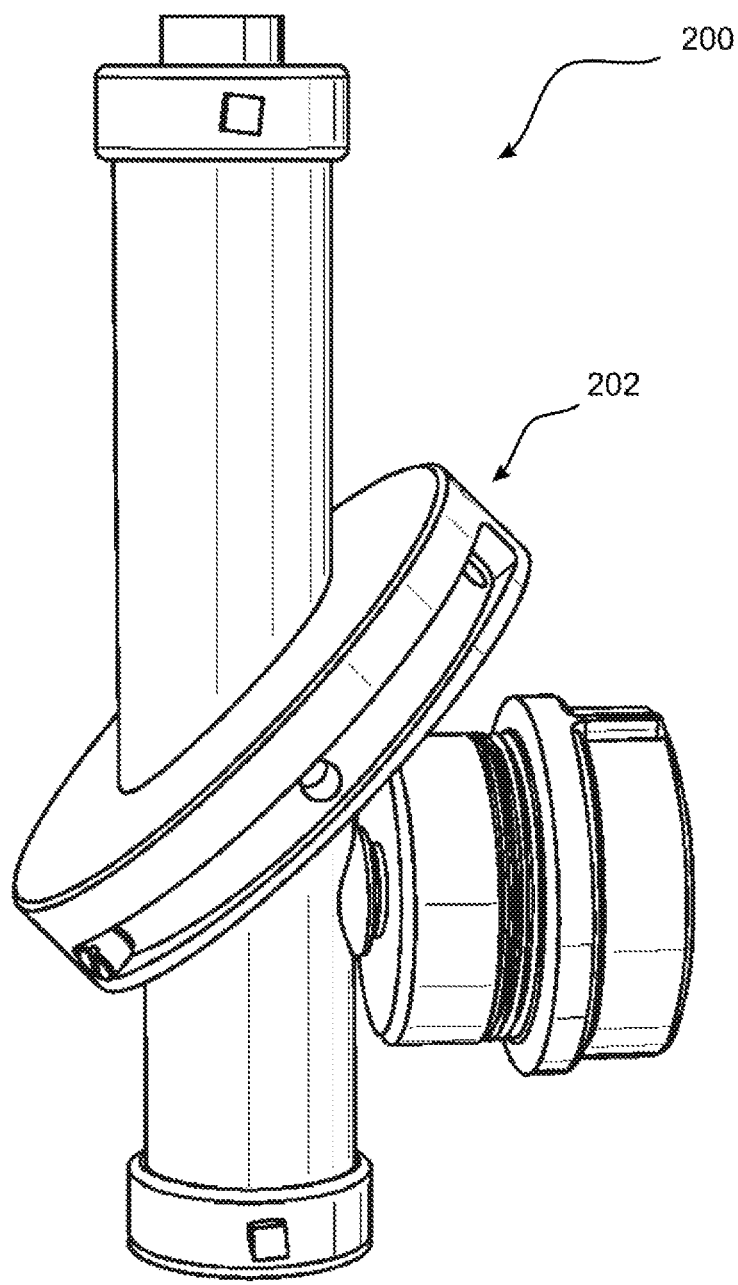
Figure 2F:
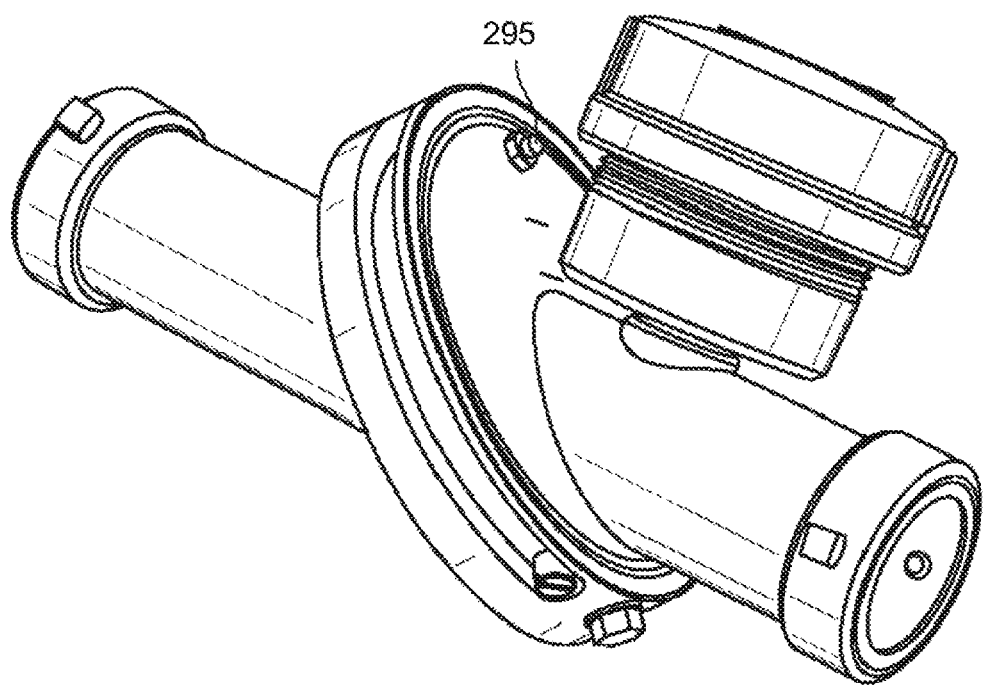
Figure 2G:
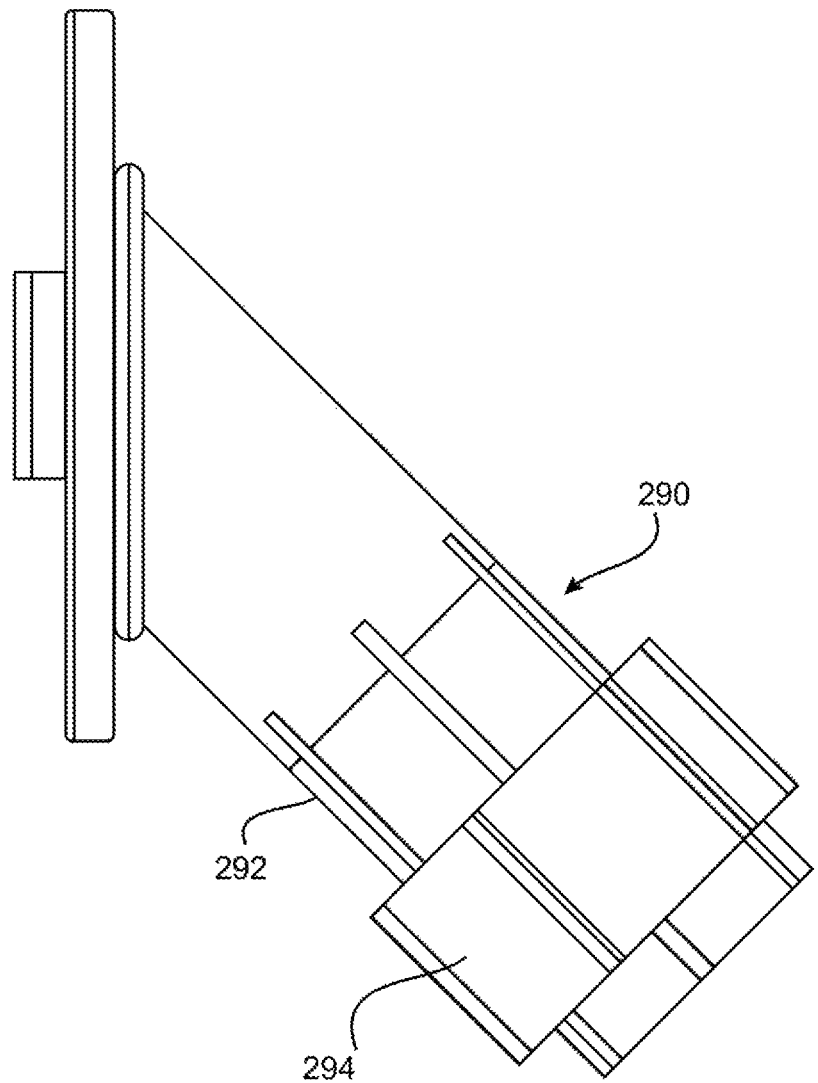
Figure 2H:
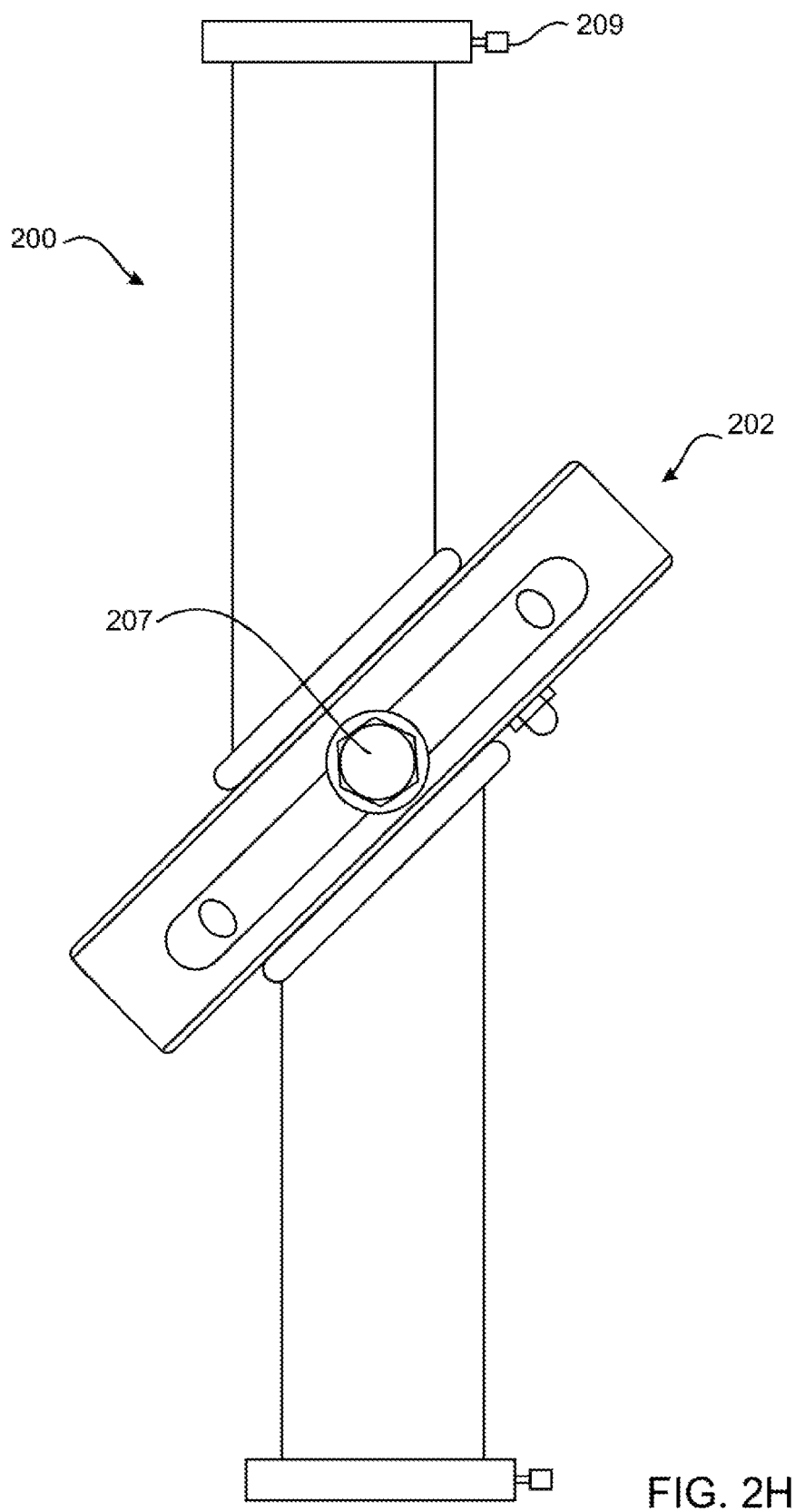
Figure 2I:
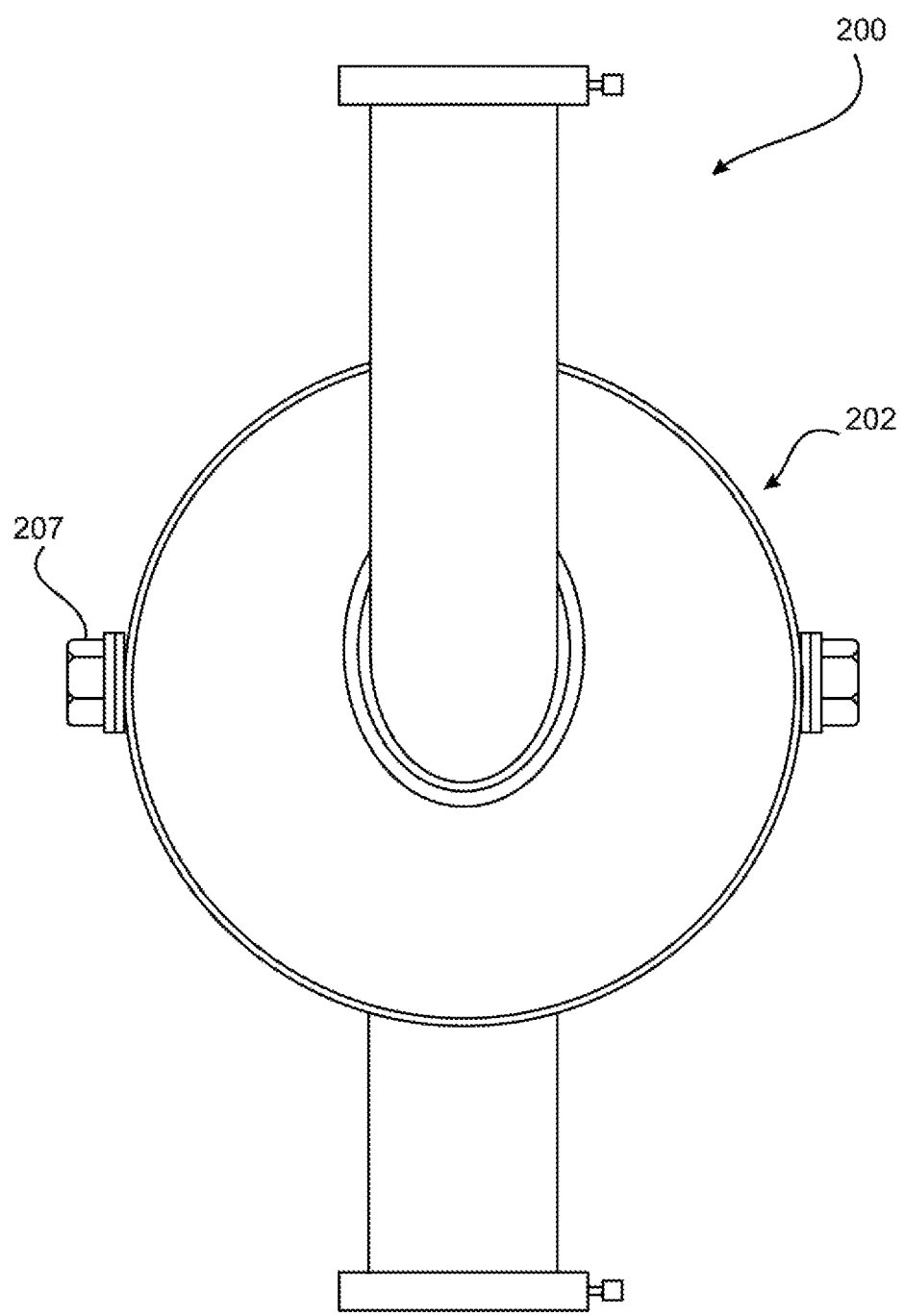

In other embodiments, the mating surface may include other fasteners, Referring to FIG. 2G, mating surface includes lock nut assembly 290. Lock nut assembly 290 comprises a longitudinally sectioned threaded cylinder 292 and a corresponding nut 294. The pre-existing pole or sections of it may be inserted into the lock nut assembly 290 and engaged by rotating nut 294 in the appropriate direction so that it travels away from the pivot joint and towards the pre-existing pole section, thereby tightening threaded cylinder 292 around the pole section and locking it into place. Fasteners could also be implemented as any combination of latches, clamps, biasing members, elastomeric membranes, ratchets, or friction fit members.

Turning to FIG. 2C, upon the upper pole section 251 being inserted within the pole adaptor 214, such that the mating surface 216 receives an end 252 of the upper pole section 251, the internal wiring tube 218 is configured to include a first overlap 254 between the internal wiring tube 218 and the received end 252 of the pole section 251 to provide a water resistant connection to the pole section 251. This first overlap 254 may have sufficient dimension in the longitudinal direction to prohibit water from spilling over into the interior of the wiring tube where it may contact the wiring, such as, for example, 5 inches, 8 inches, 12 inches or more in the longitudinal direction. Overlap dimensions may be chosen in dependence upon the length, weight, or other characteristics of the pole section to be supported. Internal wiring tube 218 also includes uncovered portion 242, which is not surrounded by a first end of pole adaptor 214 of upper adaptor 210. Uncovered portion 242 protrudes from the mating surface 216 along the longitudinal axis such that it extends past an upper rim 244 of mating surface 216. The upper rim 244 marks the highest level water may accumulate. Thus, uncovered portion 242 ensures water cannot enter the interior 256 of internal wiring tube 218.

In some cases, installation may include replacing previous pole installations. In such cases, it may be possible to use all or part of the previous pole in the construction of the pivoting pole assembly. The pole to be replaced may be wired into an existing electrical system. It is often necessary to rewire all or part of the pole. FIGS. 2A-2B and 2D-2F illustrate a pivot joint adaptor 200 incorporating a junction box module 270. The pivot joint adaptor 200 of FIG. 2A shows a junction box module 270 incorporated into lower adaptor 212. Additionally or alternatively, junction box module 270 may be incorporated into upper adaptor 210, or left out entirely. The junction box module 270 provides access to wiring running internal to the pole which may then be sealed against environment conditions. The junction box module 270 includes a compartment 272 coupled to the lower adaptor 212 communicating with the interior passage of the lower adaptor 212, the compartment having a sealable opening to the pole exterior. The opening may be sealable by a cap 276. The cap 276 and the opening may be threaded for weatherproof engagement. Some junction box modules may feature rectangular or other shapes, hinged lids, or other features common to electrical systems environmentally sealed for outdoor use. Various embodiments may or may not include a junction box module. Note that the pivot joint adaptor of FIG. 2C lacks a junction box module.

Referring to FIG. 2D, pivoting pole assembly 280 is assembled by coupling lower pole section 250 and an upper pole section 251 using pivot joint adaptor 200. Assembling the pivoting pole assembly 280 may be carried out by running upper wires 260 through upper pole section 251 and running lower wires 261 through lower pole section 250, followed by running upper wires 260 through upper adaptor 210 and running lower wires 261 through lower adaptor 212 until they meet in junction box 270. Upper and lower wires 260, 261 may be single conductors, twisted pair, optical fibre, coaxial cable, or any other wiring or cabling known in the art. Either or both of wires 260, 261 may alternatively be legacy equipment from a previous installation. Further wiring 262 may be conveniently carried out in junction box 270.

Assembly may be continued by assembling pivot joint adaptor 200 and engaging pole sections 250, 251 with the mating surface 216 of the corresponding adaptor assembly 212, 21, with wires 260, 261 in place. Pivot joint adaptor 200 may be assembled by connecting and engaging pivot members 220, 222. Mating surface 216 may be engaged with a respective pole section (250, 251) by inserting the rim of the pole section into an open end 217 of the mating surface 216, into the annulus formed by the mating surface 216 and the internal wiring tube 218, and sliding the pole section axially until it comes to rest against the pivot member or other support member (not shown). Alternatively, fastener 209 may be engaged to support the pole section without support of the pole section from beneath. The extension of internal wiring tube 218 past the rim of mating surface 216 may facilitate insertion of the pole section 250, 251. Fastener 209 is engaged to prohibit movement of the pole section 250, 251 with respect to the mating surface 216.

Although pivoting pole assembly 280 is shown with both upper adaptor 210 and lower adaptor 212 having a pole adaptor 214, in some embodiments only one of upper adaptor 210 and lower adaptor 212 includes pole adaptor 214, and the other adaptor assembly is secured to the respective pole section using a welded connection or the like, or the adaptor assembly and the respective pole section are cast as a single unit.

Figure 3A:
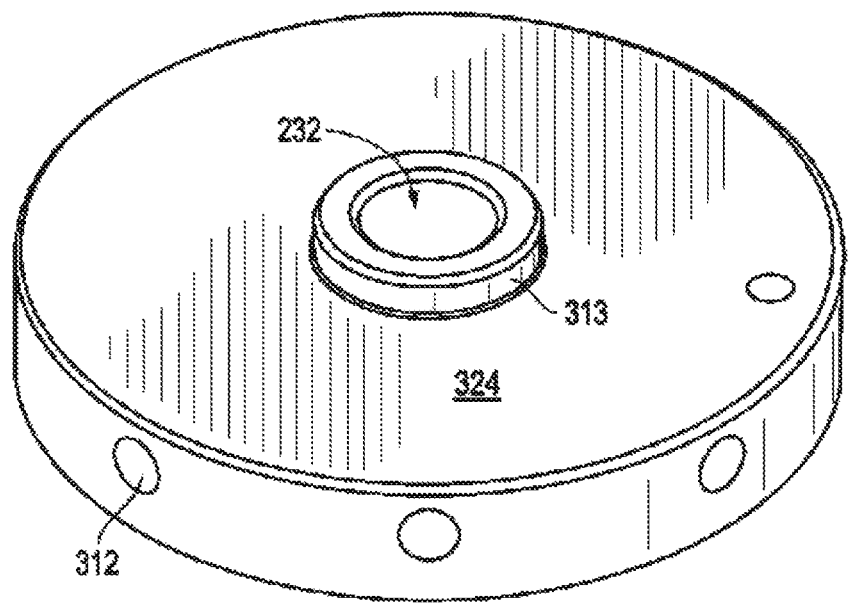
FIGS. 3A-3E illustrate pivot members in accordance with embodiments of the present disclosure.
Figure 3B:
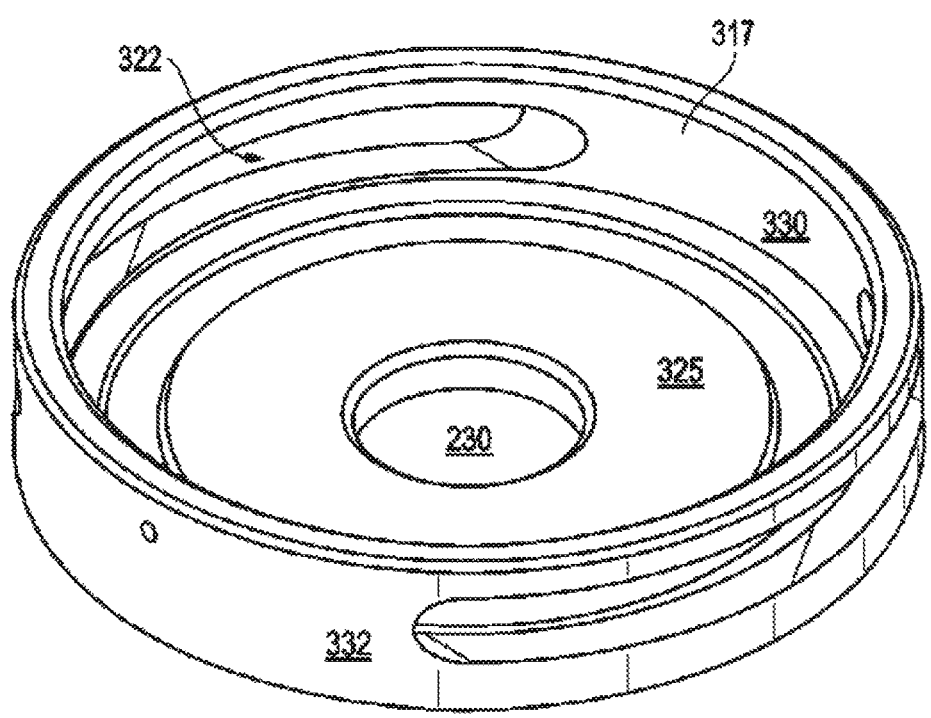
Figure 3C:
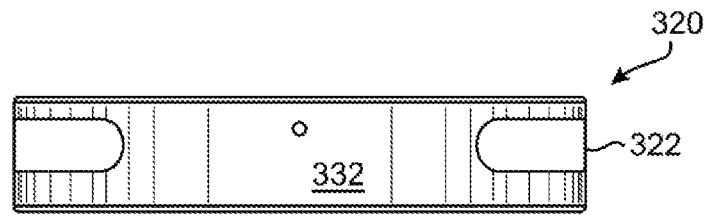
Figure 3D:
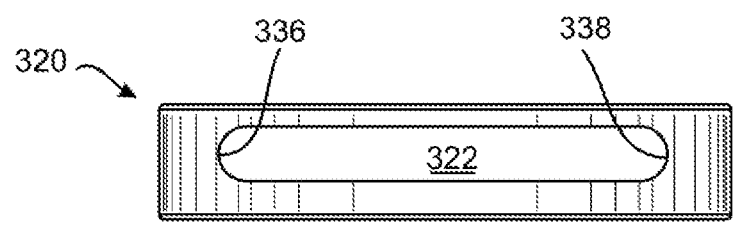
Figure 3E:
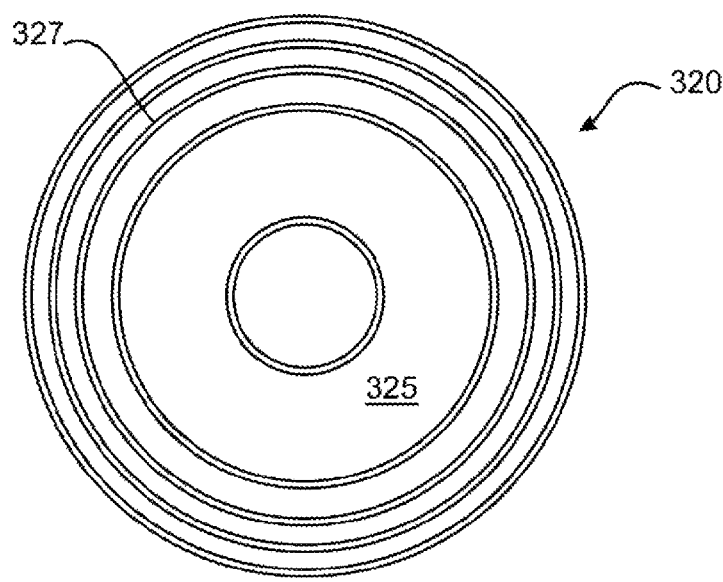

FIGS. 3A-3E illustrate pivot members in accordance with embodiments of the present disclosure. FIG. 3A illustrates a perspective view of a first pivot joint component in accordance with embodiments of the invention. FIG. 3B illustrates a perspective view of a second example pivot joint component in accordance with embodiments of the invention. FIGS. 3C-3D illustrate profile views of the same component. FIG. 3E illustrates an overhead view of the same component. Either of first pivot joint component or second pivot joint component may be incorporated as upper pivot member 220, with the other of first pivot joint component and second pivot joint component incorporated as lower pivot member 222.

Referring to FIGS. 3A and 3B, the first component 310 defines a first wiring passage 232 (or 230), and includes receiving holes 312 (e.g., threaded bolt holes) along its perimeter 314. The receiving holes 312 are configured to receive and engage one or more channel guides (e.g., threaded bolts). The body of the second component 320 defines a second central wiring passage 230 (or 232), a collar 317, and a perimeter 326. The collar 317 includes arcuate channels 322 on the collar along perimeter 326 corresponding to receiving holes 312. The channels are shown extending from an inner collar face 330 to an outer collar face 332.

As described above, the first component 310 and second component 320 may be rotationally coupled to one another to form a pivot joint 202. When assembled to form pivot joint 202, a hub 313 extends from the first component 310 through the rotational plane, and abuts with the second component 320, which encircles hub 313. Collar 317 extends from the second component 320, and abuts and overlaps with perimeter 314, which collar 317 encircles. For example, the components may be joined so that a generally planar inside surface 324 of the first component and meets a generally planar inside surface 325 of the second component 320, and the central wiring passages 230, 232 are aligned to share a common axis 240. The first component 310 and second component 320 may be attached to assemble the pivot joint 202 by inserting threaded bolts (not shown) through channels 322 and engaging the bolts in at least two opposing threaded bolt holes 312. A rotational surface is defined where the components meet in the process of rotating.

Returning to FIG. 3A, one or more channel guides 207 (see FIG. 2A) may be attached to the first component 310 and extend from the first component through arcuate channels 322 of the second component 320 such that upon rotation of the second component with respect to the first component, the guides 207 travel along the channels 322, or in some embodiments, the channels 322 travel around the guides 207. Channel guides 207 may be threaded bolts, pins, studs or any other protrusion cooperating with channels 322 to guide the relative rotation of the two components.

The arrangement of receiving holes, arcuate channels, and/or channel guides also provides an orienting alignment function. The design and placement of the guides and arcuate channels on the pivot joint 302 may dictate the range of motion of adaptor assemblies 210, 212 with respect to one another and thus the range of motion of pole sections 250, 251 (and of any mounted items). The range of rotation of the guides 207 with respect to arcuate channels 322 corresponds to the range of rotation of the upper adaptor 210. This range of rotation comprises a range of possible rotation defined by the one or more first channel ends 336 and the one or more second channel ends 338. When pivoting pole assembly is installed in a specific predetermined orientation, the channel ends 336, 338 represent hard stops at predetermined orientations for the upper pole section 250. The top end of the pole is pivotable through a range of motion corresponding to the arcuate channels.

The channel guides 207 and arcuate channels 322 form an annular locking mechanism that may provide a more uniform application of pressure over a larger rotational surface, thereby producing a configuration more reliably resistant to rotation. The locking mechanism is sufficient to prevent rotation due to the weight of the pole and may be sufficient to prevent rotation due to additional forces applied to the pole assembly (e.g., glancing blows from other objects at the worksite, a worker hanging or pulling, strong winds, etc.). The annular locking mechanism may also allow the centre of the pivot joint to remain open so that wiring may be run more efficiently through objects coupled to the pivot joint 202.

Pivot joint 202 may provide for increased structural integrity for supporting the load of the elongate object to be attached for installation of the pivoting pole assembly. The load is distributed to a reinforced central hub and a collar. By distributing the load to multiple points across the inside face of the joint, pivot joint 202 provides increased structural strength and smoother rotation to a pivoting pole assembly, resulting in greater control of movement. Although the central hub 313 is shown as integral with first component 310, and collar 317 is shown as integral with component 320, in alternative embodiments, the hub, collar, or both may be integral with either first component or second component, or may be later attached to either component. Some pivot joints according to the present disclosure may include multiple collars, additional hubs, rings, or spokes, struts, and so on. In some embodiments, either or both of reinforced central hub and collar extend through a plane of rotation, providing further structural strength.

Pivot joint 202 may provide for increased structural integrity with respect to preventing ingress of moisture and the resulting break down of lubrication in the joint. These problems may lead to excessive friction, which may cause increased wear and a higher likelihood of dangerous non-uniform (i.e., start-stop) motion when rotating the joint.

Pivot joint 202 may further comprise a lubrication system including a lubrication port 295 (FIG. 2F) for receiving the lubrication. The lubrication port 295 is in fluid connection with a lubrication channel 327 (FIG. 3E) which distributes lubrication around the rotational surfaces of pivot joint 202. The lubrication system allows distribution of lubrication to the pivot joint without loosening or removing components of the joint.

Figure 4A:
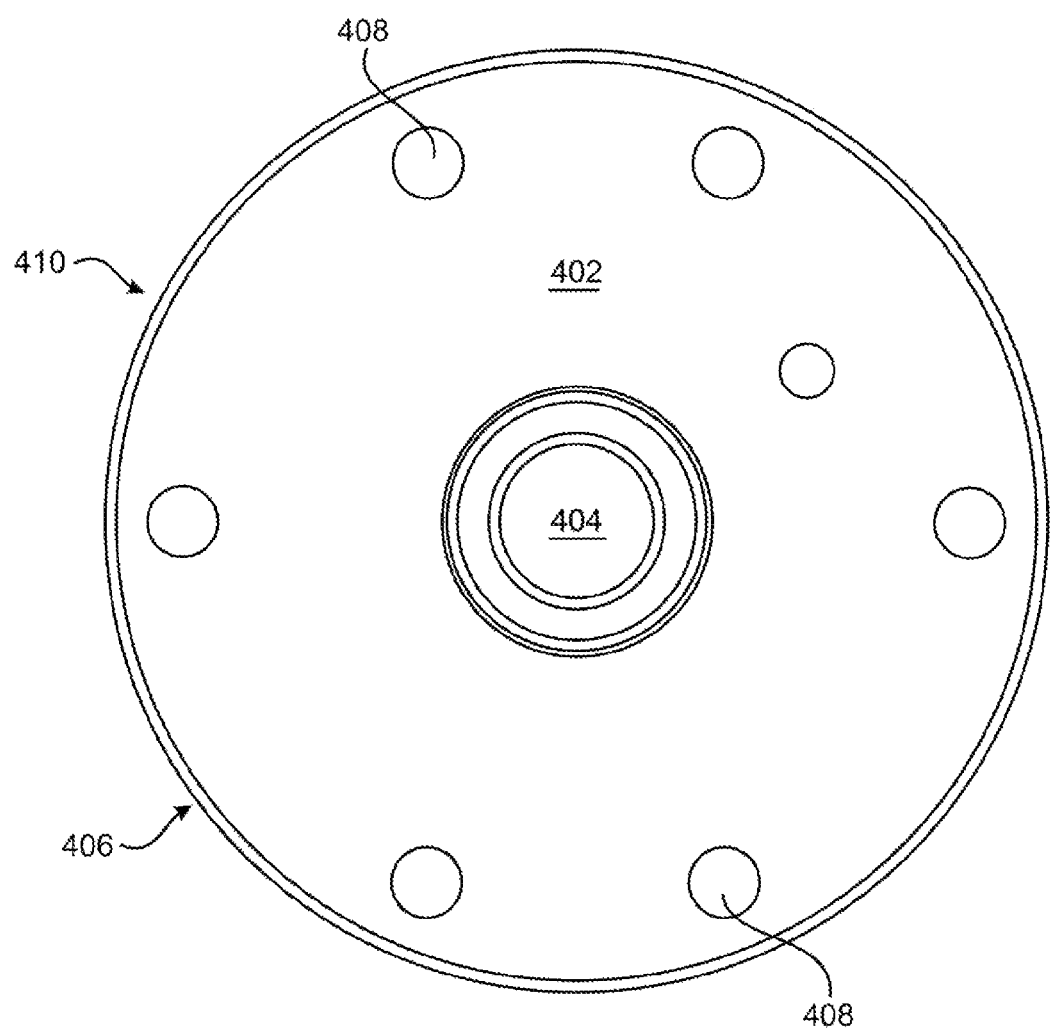
FIGS. 4A-4B illustrate an alternative embodiment of a pivot joint in accordance with embodiments of the invention.
Figure 4B:
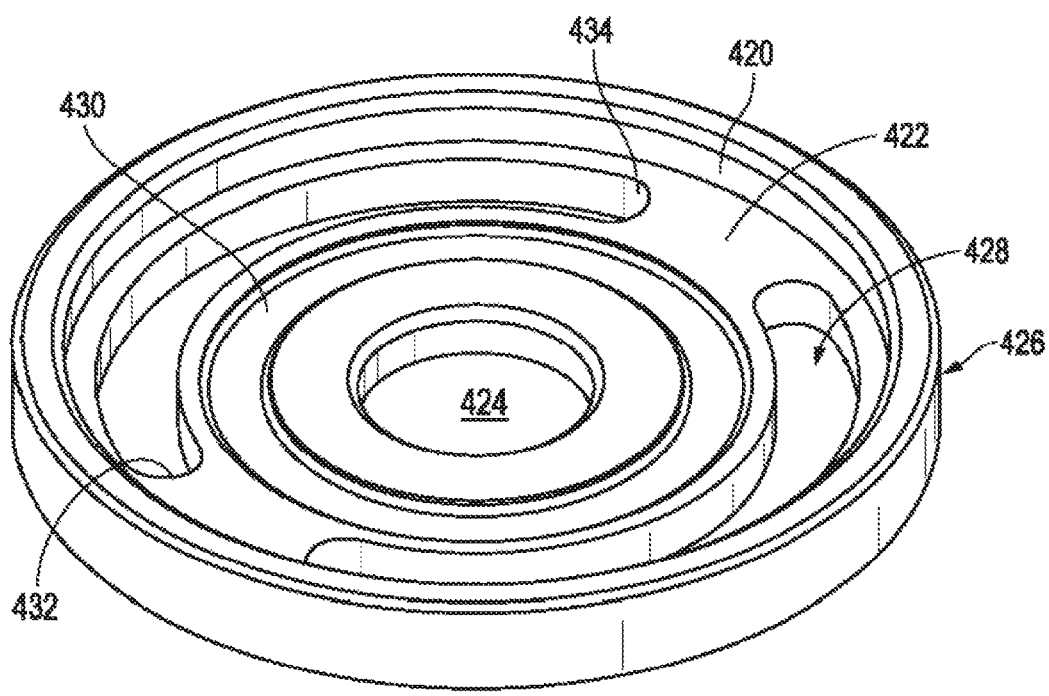

FIGS. 4A-4B illustrate an alternative embodiment of pivot joint 202 in accordance with embodiments of the invention. FIG. 4A illustrates an overhead view of a first pivot joint component in accordance with other embodiments of the invention. FIG. 4B illustrates a perspective view of a second example pivot joint component in accordance with other embodiments of the invention. The first component 410 has a first inside face 402. The body of the first component 410 defines a first substantially toroid central wiring passage and a perimeter 406. The first component 410 also includes receiving holes 408 (e.g., threaded bolt holes) configured to receive and engage one or more protrusions (e.g., threaded bolts).

The second component 420 has a second inside face 422. The body of the second component 420 defines a second substantially toroid central wiring passage 430, a perimeter 426, and one or more arcuate channels 428 corresponding to receiving holes 408. The channels 408 are located a radial distance from the common axis of rotation and extend through the second component 420. Each channel 408 includes a first channel end 432 and a second channel end 434.

The first component 410 and second component 420 may be rotationally coupled to one another to form a pivot joint, as described above. For example, first component 410 and second component 420 may be joined so that inside faces 402 and 422 meet and toroid central wiring passages 430 are aligned. The rotational surfaces contact in a rotational plane and rotate about the common axis, which is perpendicular to the rotational plane.

Protrusions (not shown) may be adapted for engagement with the first component 410 (e,g., bolts), or may be manufactured integral to the first component 410 (e.g., studs). That is, the first component 410 and protrusions may be formed from the same continuous piece of material. For example, the first component 410 and protrusions may be cast or moulded in one mould. Alternatively, the first component 410 and protrusions may be machined or otherwise cut as one continuous piece from the same block or sheet of plastic or metal. Other parts may also be formed integrally with the first component 410 or second component 420.

An annular locking mechanism may be formed from protrusions and arcuate channels. Pivot joint components as in FIGS. 4A-4B may be sufficiently tightened to provide sufficient friction between the inside faces 324 and 325 of flange plates to prevent rotation.

To provide for re-orienting the elongate object to access mounted items for repair, maintenance, and the like, the bolts may be loosened sufficiently to allow rotation when desired. The upper pole section may be oriented to place the item at a lower elevation that better facilitates access to the item when access is required, and then re-oriented to restore the item to a higher elevation for daily operation. Channel ends therefore prevent overshoot when lifting a connected upper pole section into an operational orientation, which may provide simpler, easier, safer, and/or more precise operation.

The optimal operational orientation may correspond to a perfect vertical orientation (i.e., 90 degrees from horizontal) for the upper pole section, or just past a perfect vertical orientation so that minimal effort is required to be exerted by a user to maintain the upper pole section in position with the guide against the channel end while the pivot joint is tightened or otherwise locked in place. The optimal operational orientation may also correspond with the preferred or maximum height for a mounted item or for an item otherwise attached to the upper pole section.

The optimal target orientation may correspond to a horizontal orientation or a slightly above or below horizontal orientation. The optimal target orientation may be configured to provide access to the mounted item at an optimum access elevation. The optimum access elevation may include various elevations according to the item to be maintained or replaced, the schedule of maintenance or replacement, the operating environment, number of available workers, ergonomic or safety concerns, union rules, government or association regulations, local population preferences, and so on.

For example, in some implementations the pivot joint may be used to place a light pole section in a predetermined optimal access orientation for performing maintenance work on the mounted item (such as, for example, a light fixture). This optimal orientation may locate the light fixture at an elevation to facilitate maintenance, such as, for example, a height just above a walkway, an average waist height for personnel, an average chest height for personnel; a point somewhere between; or any other desired predetermined elevation to optimize one or more maintenance operations. After maintenance is concluded, disclosed embodiments allow personnel to return the light pole section to a predetermined optimal operational orientation (such as, for example, 90 degrees from horizontal) which may be the section's nominal orientation throughout its operational lifetime.

In some implementations, the alignment stop may be used to further lock the pivot joint from rotating. The alignment stop may be threaded. A secondary receiving hole 312"/408" may be used to receive a secondary stop to lock the upper object section 406 in place at the ends of the range of rotation, or as a safety device to provide a minimum possible elevation until the stop is removed.

For example, a secondary threaded receiving hole 312'/408' may be configured so that, upon at least one guide abutting at least one first channel end (optimal operational orientation), a secondary receiving hole is aligned with a second channel end, so that upon engagement with the secondary receiving hole 312'/408' the threaded alignment stop abuts or nearly abuts the second channel end, thereby preventing rotation away from the optimal operational orientation.

As used herein, the term "operative angle" means an angle of between 5 degrees and 85 degrees.

Figure 5:
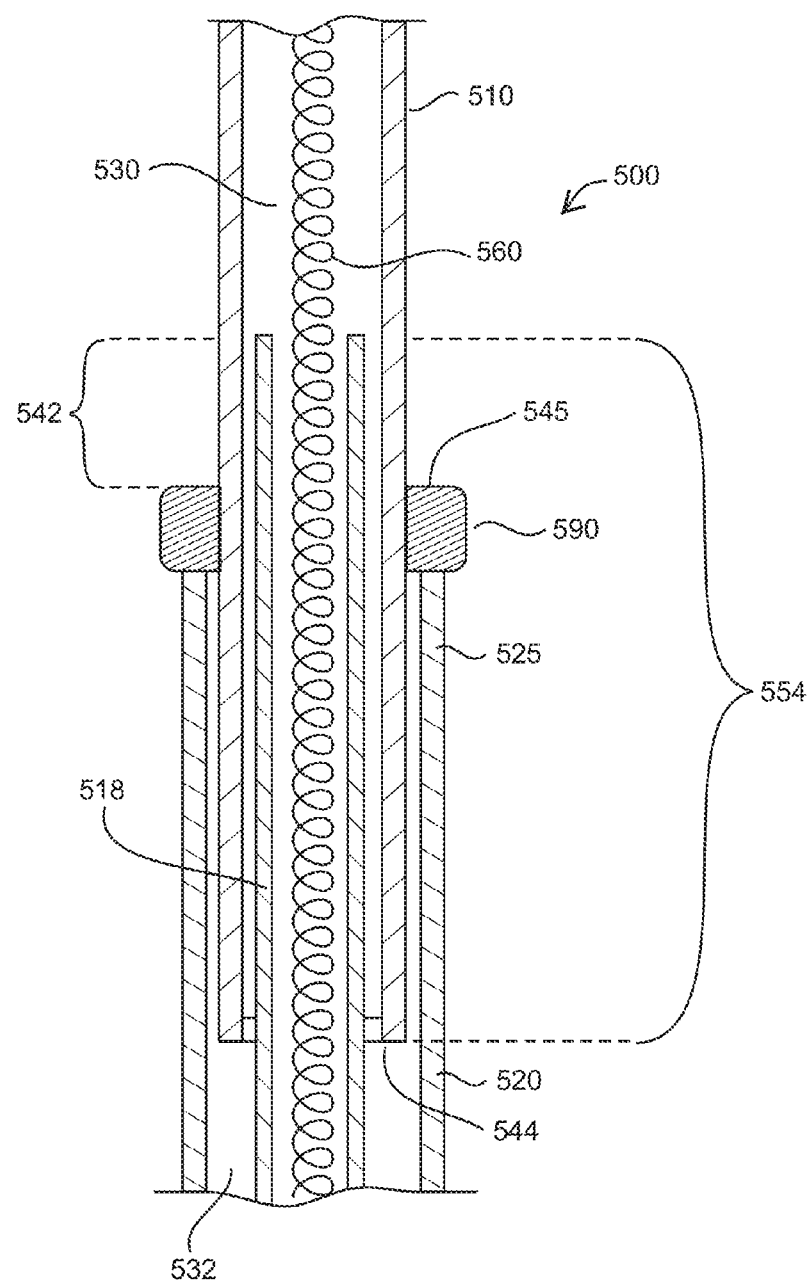
FIG. 5 illustrates a joint according to an alternative embodiment of the present invention.

FIG. 5 illustrates schematically an alternative embodiment of the present invention, used in connection with a telescoping light pole 500. The light pole 500 has an upper pole section 510 which is arranged to slide within a receiving sleeve 525, being an upper portion of a co-axial lower pole section 520, to effect lowering of the light pole. A locking means 590 is located at an upper end of the lower pole section 520, to selectively permit or restrict movement of the upper pole section 510.

The upper pole section 510 is hollow, with a first wiring passage 530 defined within. The lower pole section 520 is also hollow, with a second wiring passage 532 defined within.

An internal wiring tube 518 is axially aligned internally of the upper pole section 510 and lower pole section 520. The upper pole section 510 includes an inner rim 544 at a lower end thereof.

The internal wiring tube 518 is configured to include a first overlap 554 between the internal wiring tube 518 and the rim 544 of the upper pole section 510. Internal wiring tube 518 also includes uncovered portion 542, which is not surrounded by an upper end of lower pole section 520. Uncovered portion 542 protrudes upwardly along the longitudinal axis such that it extends past an upper rim 545 of lower pole section 520.

The discussion above has focused primarily on embodiments of the invention for use with lowering pole assemblies for industrial light poles. Other embodiments may be used with other types of elongate objects, or in other environments. It should be understood that the inventive concepts disclosed herein are capable of many modifications. Modifications and variations as would be apparent to a skilled addressee are deemed to be within the scope of the present invention.

Having described the invention, the following is claimed:

1. A joint for use in a lowering pole assembly, the lowering pole assembly including:
   a lower pole section having an uppermost edge; and
   an upper pole section having an internal surface, the upper pole section being moveable relative to the lower pole section,
   the joint including:
      a lower portion defining a first central wiring passage which is fixed relative to the lower pole section;
      an upper portion defining a second central wiring passage which is fixed relative to the upper pole section, the second central wiring passage communicating with the first central wiring passage; and
      an internal wiring tube communicating with the first central wiring passage and the second central wiring passage, the internal wiring tube extending inside the upper pole section, the internal wiring tube having an upper end located above the uppermost edge of the lower pole section, the internal wiring tube being parallel to and spaced from the internal surface of the upper pole section, the internal wiring tube having an overlap portion with the upper pole section such that the upper end of the internal wiring tube is located higher than a lower end of the upper pole section, the overlap portion providing a water flow resistance between the upper pole section and the internal wiring tube.

2. A joint for use in a lowering pole assembly as claimed in claim 1, wherein the upper pole section is receivable inside a receiving sleeve.

3. A joint for use in a lowering pole assembly as claimed in claim 2, wherein the receiving sleeve forms part of the lower pole section.

4. A joint for use in a lowering pole assembly as claimed in claim 2, wherein the receiving sleeve is connected to the upper portion of the joint.

5. A joint for use in a lowering pole assembly as claimed claim 2, wherein the internal wiring tube includes a first end that protrudes from an open end of the receiving sleeve along the longitudinal axis.

6. A joint for use in a lowering pole assembly as claimed in claim 5, wherein the upper pole section is rotationally coupled to the lower pole section about an axis of rotation, and wherein the axis of rotation intersects the first wiring passage and the second wiring passage.

7. A joint for use in a lowering pole assembly as claimed in claim 5, wherein the upper pole section is rotationally coupled to the lower pole section about an axis of rotation, and wherein the axis of rotation is coaxial with the first wiring passage and the second wiring passage.

8. A joint for use in a lowering pole assembly as claimed in claim 1, wherein at least one of the lower portion of the joint and the upper portion of the joint includes a junction box module.

9. A joint for use in a lowering pole assembly as claimed in claim 1, wherein the lower portion and the upper portion each include a pole adaptor mounted at an operative angle to the axis of rotation.

10. A joint for use in a lowering pole assembly as claimed in claim 9, wherein each pole adaptor is substantially cylindrical and the longitudinal axis of the cylindrical pole adaptor of the lower joint portion and the longitudinal axis of the cylindrical pole adaptor of the upper joint portion are coaxial or offset.

11. A joint for use in a lowering pole assembly, the lowering pole assembly including:
 a lower pole section and
 an upper pole section having an internal surface, the upper pole section being moveable relative to the lower pole section,
the joint including:
 a lower portion defining a first central wiring passage which is fixed relative to the lower pole section;
 an upper portion defining a second central wiring passage which is fixed relative to the upper pole section, the second central wiring passage communicating with the first central wiring passage; and
 an internal wiring tube communicating with the first central wiring passage and the second central wiring passage, the internal wiring tube being parallel to the upper pole section, the internal wiring tube having an overlap portion with the upper pole section formed by an annular space between the internal surface of upper pole section and the internal wiring tube, the overlap portion providing a water flow resistance between the upper pole section and the internal wiring tube.

\* \* \* \* \*